United States Patent
Liu

(10) Patent No.: US 9,059,594 B2
(45) Date of Patent: Jun. 16, 2015

(54) BATTERY SWITCHING CHARGER AND METHOD FOR CONTROLLING BATTERY SWITCHING CHARGER

(71) Applicant: Energy Pass Incorporation, Hsinchu (TW)

(72) Inventor: Chao-Hsuan Liu, New Taipei (TW)

(73) Assignee: Energy Pass Incorporation, Hsinchu Science Park, Hsinchu (TW)

(*) Notice: Subject to any disclaimer, the term of this patent is extended or adjusted under 35 U.S.C. 154(b) by 454 days.

(21) Appl. No.: 13/688,125

(22) Filed: Nov. 28, 2012

(65) Prior Publication Data

US 2014/0145671 A1     May 29, 2014

(51) Int. Cl.
  *H01M 10/44*     (2006.01)
  *H01M 10/46*     (2006.01)
  *H02J 7/00*     (2006.01)
  *H02J 7/02*     (2006.01)

(52) U.S. Cl.
  CPC ............... *H02J 7/007* (2013.01); *H02J 7/0042* (2013.01); *H02J 7/022* (2013.01)

(58) Field of Classification Search
  CPC ........ H02J 7/0013; H02J 7/0068; H02J 7/007
  USPC .......... 320/127, 128, 132, 134, 136, 139, 141
  See application file for complete search history.

(56) References Cited

U.S. PATENT DOCUMENTS

| | | | |
|---|---|---|---|
| 6,559,684 B2 * | 5/2003 | Goodfellow et al. | 327/53 |
| 7,345,894 B2 * | 3/2008 | Sawtell et al. | 363/21.11 |
| 2013/0293211 A1 * | 11/2013 | Chen | 323/282 |

* cited by examiner

*Primary Examiner* — Edward Tso
(74) *Attorney, Agent, or Firm* — Winston Hsu; Scott Margo

(57) ABSTRACT

A battery switching charger includes a PWM signal generator, a switching circuit, an inductor, a resistor and an analog-to-digital converter. The PWM signal generator is utilized for generating a PWM signal. The switching circuit includes cascoded transistors controlled by the PWM signal for generating an output voltage. The inductor is utilized for receiving the output voltage. The resistor is coupled between the inductor and a charge terminal of the battery switching charger, where the charge terminal is connected to a battery when the battery is being charged by the battery switching charger. The analog-to-digital converter is coupled to the PWM signal generator and the resistor, and is utilized for receiving voltages of two terminals of the resistor to generate control data to the PWM signal generator. In addition, the PWM signal generator adjusts a duty cycle of the PWM signal according to the control data.

14 Claims, 3 Drawing Sheets

BATTERY SWITCHING CHARGER AND METHOD FOR CONTROLLING BATTERY SWITCHING CHARGER

BACKGROUND OF THE INVENTION

1. Field of the Invention

The present invention relates to a battery switching charger, and more particularly, to a battery switching charger that can determine a charging voltage accurately.

2. Description of the Prior Art

When a battery switching charger is charging a battery, especially a lithium battery, the battery switching charger needs to provide an accurate and stable charging voltage to charge the battery. The conventional battery switching charger generally has a feedback control loop to provide the accurate charging voltage to the battery, however, how to build a feedback control loop that can provide the accurate and stable charging voltage is an important topic.

SUMMARY OF THE INVENTION

It is therefore an objective of the present invention to provide a battery switching charger that can provide an accurate and stable charging voltage.

According to one embodiment, a battery switching charger comprises a PWM signal generator, a switching circuit, an inductor, a resistor and an analog-to-digital converter. The PWM signal generator is utilized for generating a PWM signal. The switching circuit comprises cascoded transistors controlled by the PWM signal for generating an output voltage. The inductor is coupled to the switching circuit, and is utilized for receiving the output voltage. The resistor is coupled between the inductor and a charge terminal of the battery switching charger, where the charge terminal is connected to a battery when the battery is being charged by the battery switching charger. The analog-to-digital converter is coupled to the PWM signal generator and the resistor, and is utilized for receiving voltages of two terminals of the resistor to generate control data to the PWM signal generator. In addition, the PWM signal generator adjusts a duty cycle of the PWM signal according to the control data.

According to another embodiment of the present invention, a method for controlling a battery switching charger comprises: generating a PWM signal; providing a switching circuit comprising cascoded transistors controlled by the PWM signal for generating an output voltage; providing an inductor coupled to the switching circuit, for receiving the output voltage; providing a resistor coupled between the inductor and a charge terminal of the battery switching charger, wherein the charge terminal is connected to a battery when the battery is being charged by the battery switching charger; providing an analog-to-digital converter coupled to the PWM signal generator and the resistor, for receiving voltages of two terminals of the resistor to generate control data; and adjusting a duty cycle of the PWM signal according to the control data.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
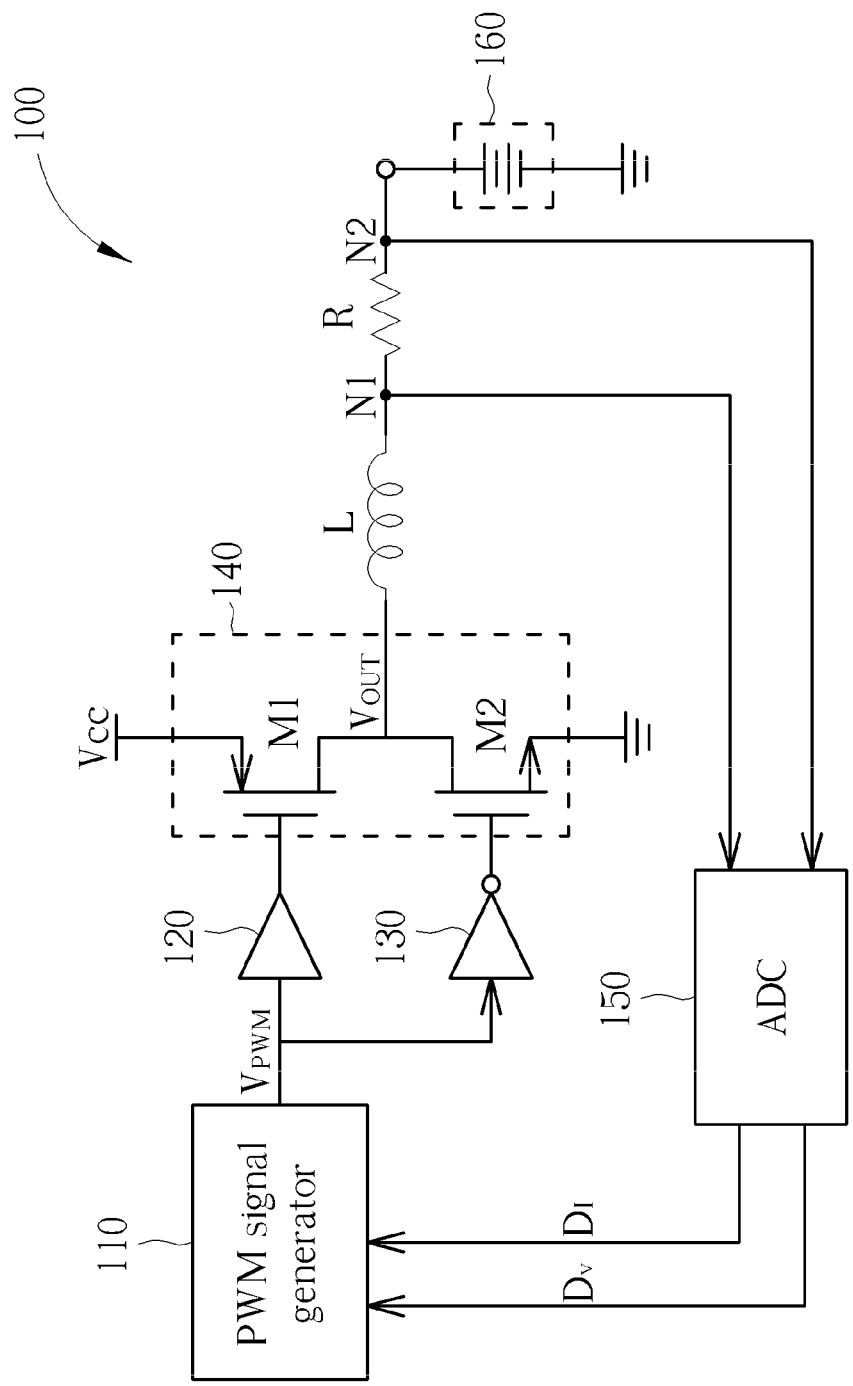
FIG. 1 is a diagram illustrating a battery switching charger according to one embodiment of the present invention.

Please refer to FIG. 1, which illustrates a battery switching charger 100 according to one embodiment of the present invention. As shown in FIG. 1, the battery switching charger 100 includes a pulse width modulation (PWM) signal generator 110, a driver 120, an inverter 130, a switching circuit 140, an inductor L, a resistor R and an analog-to-digital converter (ADC), where the switching circuit 140 includes cascoded transistors M1 and M2. In addition, in the battery switching charger 100 is used to provide a stable and accurate voltage (e.g., 4.2 volts) to charge a battery 160. In this embodiment, the battery 160 is a lithium battery.

In the operations of the battery switching charger 100, the PWM signal generator 110 generates a PWM signal $V_{PWM}$ to control the switching circuit 140 via the driver 120 and the inverter 130. In detail, the duty cycle of the PWM signal $V_{PWM}$ determines turn-on periods and turn-off periods of the transistors M1 and M2 to generate an output voltage $V_{OUT}$. Then, the output voltage $V_{OUT}$ passes through the inductor L and the resistor R to charge the battery 160.

Figure 2:
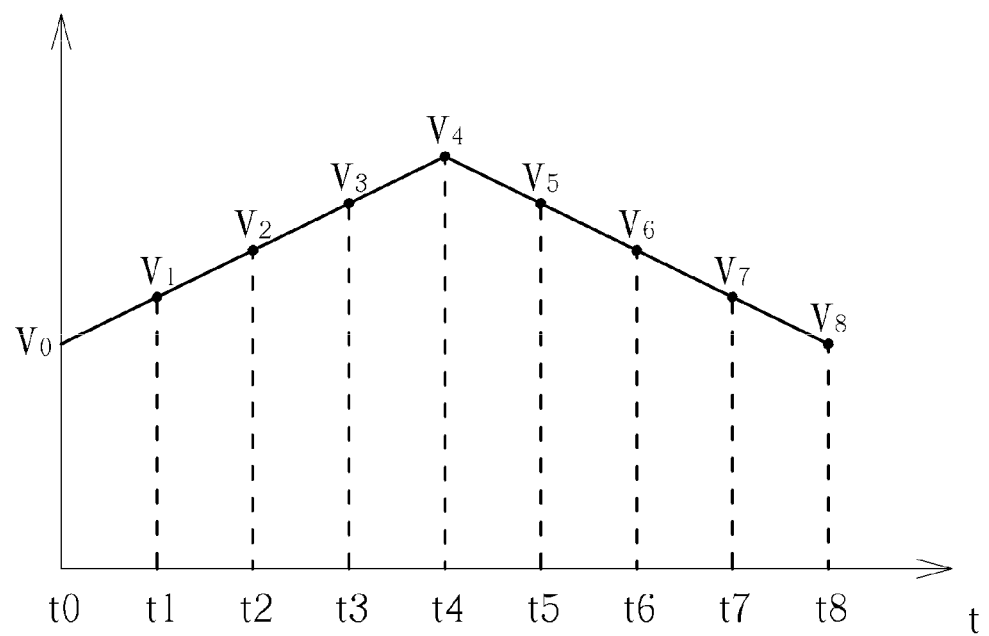
FIG. 2 shows a diagram illustrating the signal within a PWM period of the PWM signal.

The ADC 150 receives voltages of two terminals N1 and N2 of the resistor R, where the voltage differences between the terminals N1 and N2 can be used by the ADC 150 to generate a signal which is represented as a current flowing through the resistor R. Then, the ADC 150 samples the signal derived from the voltages of the two terminals N1 and N2 of the resistor R to generate the control data $D_I$. In addition, in this embodiment, a sampling rate of the ADC 150 is higher than a frequency of the PWM signal $V_{PWM}$, and the ADC 150 samples the signal within a period shorter than a PWM period of the PWM signal to generate the control data $D_I$. In detail, please refer to FIG. 2, which is a diagram illustrating the signal within a PWM period of the PWM signal $V_{PWM}$. For example, the ADC 150 can sample the signal at times t0-t4 to generate the control data $D_I$, that is the control data $D_I$ is generated according to the sampled voltages $V_0$-$V_4$ (for example, the control data $D_I$ can be an average of the sampled voltages $V_0$-$V_4$).

Then, the PWM signal generator 110 receives the control data $D_I$, and uses the control data $D_I$ to generate estimated data associated with the current flowing through the resistor R, and utilizes the estimated data to adjust the duty cycle of the PWM signal $V_{PWM}$. In detail, although the control data Di merely represents the sampled voltages $V_0$-$V_4$, the PWM signal generator 110 can use the control data $D_I$ to predict the other sampled voltages $V_5$-$V_8$ to generate the estimated data. If the estimated data indicated that the current flowing through the resistor R is too low (i.e., the output voltage Vout is lower than a required charging voltage), the PWM signal generator 110 increases the duty cycle of the PWM signal $V_{PWM}$; and if the estimated data indicated that the current flowing through the resistor R is too high (i.e., the output voltage $V_{OUT}$ is greater than the required charging voltage), the PWM signal generator 110 decreases the duty cycle of the PWM signal $V_{PWM}$.

Furthermore, the PWM signal generator 110 compares the estimated data with a threshold value, and when the estimated data reaches the threshold value, the PWM signal generator 110 immediately changes a state of the PWM signal $V_{PWM}$ (i.e., turn off the transistor M1) to immediately lower the output voltage $V_{OUT}$.

In addition, the ADC 150 also samples the voltage of the terminal N2 (i.e., the feedback voltage of the battery switching charger 100) to generate control data $D_v$, where the control data $D_v$ is a digital representation of the voltage of the terminal N2. Then, the PWM signal generator 110 receives the control data $D_v$, and utilizes the control data $D_v$ to adjust the duty cycle of the PWM signal $V_{PWM}$. In detail, if the control data $D_v$ indicated that the voltage of the terminal N2 is too low by comparing the control data $D_v$ with a threshold code, the PWM signal generator 110 increases the duty cycle of the PWM signal $V_{PWM}$, and if the control data $D_v$ indicated that the voltage of the terminal N2 is too high by comparing the control data $D_v$ with the threshold code, the PWM signal generator 110 decreases the duty cycle of the PWM signal $V_{PWM}$.

In one embodiment, the PWM signal generator 110 can first use the control data $D_I$ to adjust the duty cycle of the PWM signal $V_{PWM}$, and then the control data $D_v$ is used to adjust the duty cycle of the PWM signal $V_{PWM}$ later.

Figure 3:
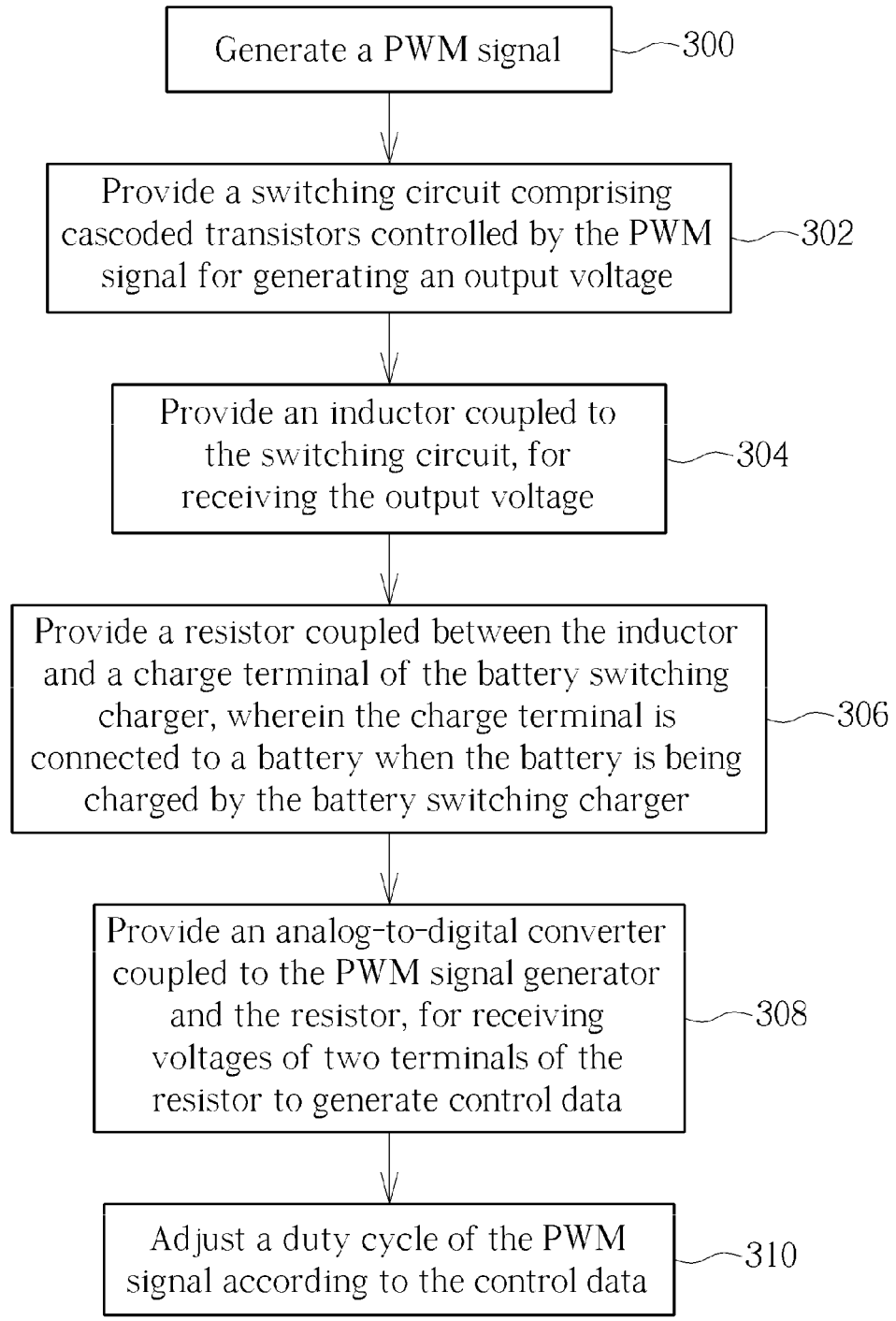
FIG. 3 is a flowchart of a method for controlling a battery switching charger according to one embodiment of the present invention.

Please refer to FIG. 3, which is a flowchart of a method for controlling a battery switching charger according to one embodiment of the present invention. Referring to FIG. 1 and FIG. 3, the flow is described as follows:

Step 300: generate a PWM signal.

Step 302: provide a switching circuit comprising cascoded transistors controlled by the PWM signal for generating an output voltage.

Step 304: provide an inductor coupled to the switching circuit, for receiving the output voltage.

Step 306: provide a resistor coupled between the inductor and a charge terminal of the battery switching charger, wherein the charge terminal is connected to a battery when the battery is being charged by the battery switching charger.

Step 308: provide an analog-to-digital converter coupled to the PWM signal generator and the resistor, for receiving voltages of two terminals of the resistor to generate control data.

Step 310: adjust a duty cycle of the PWM signal according to the control data.

Briefly summarized, in the battery switching charger and associated method of the present invention, the ADC is applied to the battery switching charger to generate the control data within a period shorter than a PWM period of the PWM signal. Then, the PWM signal generator generates an estimated data according to the control data to adjust the duty cycle of the PWM signal. Therefore, the battery switching charger can provide a stable and accurate charging voltage to the battery.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A battery switching charger, comprising:
    a pulse width modulation (PWM) signal generator, for generating a PWM signal;
    a switching circuit, comprising cascoded transistors controlled by the PWM signal for generating an output voltage;
    an inductor, coupled to the switching circuit, for receiving the output voltage;
    a resistor, coupled between the inductor and a charge terminal of the battery switching charger, wherein the charge terminal is connected to a battery when the battery is being charged by the battery switching charger; and
    an analog-to-digital converter, coupled to the PWM signal generator and the resistor, for receiving voltages of two terminals of the resistor to generate control data to the PWM signal generator;
    wherein the PWM signal generator adjusts a duty cycle of the PWM signal according to the control data.

2. The battery switching charger of claim 1, wherein the analog-to-digital converter samples a signal derived from the voltages of the two terminals of the resistor to generate the control data.

3. The battery switching charger of claim 2, wherein a sampling rate of the analog-to-digital converter is higher than a frequency of the PWM signal, and the analog-to-digital converter samples the signal within a period shorter than a PWM period of the PWM signal to generate the control data.

4. The battery switching charger of claim 3, wherein the analog-to-digital converter samples the signal within the period to generate a plurality of sampled data, and the control data is an average of the sampled data.

5. The battery switching charger of claim 3, wherein the PWM signal generator receives the control data, utilizes the control data to generate estimated data associated with a current flowing through the resistor, and utilizes the estimated data to adjust the duty cycle of the PWM signal.

6. The battery switching charger of claim 5, wherein the PWM signal generator compares the estimated data with a threshold value, and when the estimated data reaches the threshold value, the PWM signal generator immediately changes a state of the PWM signal.

7. The battery switching charger of claim 1, wherein the analog-to-digital converter performs an analog-to-digital converting operation upon one of the two terminals of the resistor to generate another control data to the PWM signal generator, and the PWM signal generator adjusts the duty cycle of the PWM signal according to the another control data.

8. A method for controlling a battery switching charger, comprising:
    generating a PWM signal;
    providing a switching circuit comprising cascoded transistors controlled by the PWM signal for generating an output voltage;
    providing an inductor coupled to the switching circuit, for receiving the output voltage;
    providing a resistor coupled between the inductor and a charge terminal of the battery switching charger, wherein the charge terminal is connected to a battery when the battery is being charged by the battery switching charger;
    providing an analog-to-digital converter coupled to the PWM signal generator and the resistor, for receiving voltages of two terminals of the resistor to generate control data; and adjusting a duty cycle of the PWM signal according to the control data.

9. The method of claim 8, wherein the analog-to-digital converter samples a signal derived from the voltages of two terminals of the resistor to generate the control data.

10. The method of claim 9, wherein a sampling rate of the analog-to-digital converter is higher than a frequency of the PWM signal, and the analog-to-digital converter samples the signal within a period shorter than a PWM period of the PWM signal to generate the control data.

11. The method of claim 10, wherein the analog-to-digital converter samples the signal within the period to generate a plurality of sampled data, and the control data is an average of the sampled data.

12. The method of claim 10, wherein the step of adjusting the duty cycle of the PWM signal according to the control data comprises:

utilizing the control data to generate estimated data associated with a current flowing through the resistor; and utilizing the estimated data to adjust the duty cycle of the PWM signal.

13. The method of claim 12, wherein the step of utilizing the estimated data to adjust the duty cycle of the PWM signal comprises:

comparing the estimated data with a threshold value; and when the estimated data reaches the threshold value, immediately changing a state of the PWM signal.

14. The method of claim 8, wherein the analog-to-digital converter performs an analog-to-digital converting operation upon one of the two terminals of the resistor to generate another control data, and the method further comprises:

adjusting the duty cycle of the PWM signal according to the another control data.

* * * * *